LONG TERM TIMING DEVICE AND PULSE STORAGE SYSTEM

Filed Jan. 17, 1962 4 Sheets-Sheet 1

INVENTOR
HERBERT L. FISCHER
BY
McGlew and Toren
ATTORNEYS.

LONG TERM TIMING DEVICE AND PULSE STORAGE SYSTEM

Filed Jan. 17, 1962 4 Sheets-Sheet 2

INVENTOR
HERBERT L. FISCHER
BY
M Glew and Toren
ATTORNEYS.

LONG TERM TIMING DEVICE AND PULSE STORAGE SYSTEM

Filed Jan. 17, 1962 4 Sheets-Sheet 3

INVENTOR
HERBERT L. FISCHER
BY McGlew and Toren
ATTORNEYS.

INVENTOR
HERBERT L. FISCHER
BY
McGlew and Toren
ATTORNEYS.

United States Patent Office 3,223,981
Patented Dec. 14, 1965

3,223,981

LONG TERM TIMING DEVICE AND PULSE STORAGE SYSTEM

Herbert L. Fischer, Plainview, N.Y., assignor to Logitek, Inc., Farmingdale, N.Y.

Filed Jan. 17, 1962, Ser. No. 166,846
14 Claims. (Cl. 340—172.5)

This invention relates to timing devices and, more particularly, to a novel miniaturized long-term timing device and pulse storage system.

An object of this invention is to provide a long-term timing device of extremely high accuracy, low bulk and weight, and low power consumption.

Another object of this invention is to provide a long-term timing device incorporating a digital counter.

A further object of this invention is to provide a long-term timing device incorporating a digital counter including a memory unit delay line and a lumped constant delay line.

The development of automatic controls for factory processes and for machines, as well as the development of long range missiles and the development of sub-orbital and orbital space flights, has brought about an acute need for long-term timers, or timing devices, of extremely high accuracy. In the case of missile and space flights, a further requirement is that such devices be as small as possible and have the lightest possible weight, as well as being characterized by an absolute minimum power consumption.

The present invention is directed to a novel long-term timing device involving the storage of information provided by a series of gated pulses or information bits. More particularly, the timing device includes a memory or bit storage delay line, a timer clock, a coincidence gate, and a lumped constant delay line. The gate has inputs connected to the timer clock, to the output of the memory delay line, and to the output of the lumped constant delay line. The gate further has outputs connected to the input ends of the two delay lines.

The timer clock feeds regular pulses to the gate at time intervals corresponding to the length of the memory delay line. Each time the gate "sees" coincidence between pulses arriving at any two or all three of its inputs, it routes a pulse through the lumped constant delay line. However, when a pulse reaches a gate input with no coincident pulse arrival at either of its other inputs, the gate routes the pulse to the memory delay line. For a 100 microsecond time interval and memory delay line length, the delay of the lumped constant delay line is one microsecond.

Thus, the initial pulse reaching the gate will be routed to the memory delay line and return to the gate, 100 microseconds later, coincident with the second pulse. Thereby, a pulse will be routed through the lumped constant delay line and returned to the gate one microsecond later. As there is now no pulse coincidence at the gate inputs, this pulse is routed through the memory delay line. With this arrangement, there are stored, in the memory delay line, successive information bits which are the consecutive binary representations of the consecutive clock pulse members.

To assure that the information thus stored does not, due to cumulative tolerances, change position with respect to time $(T)=0$, a memory clock, such as a megacycle memory clock, preferably is used in order to re-clock each information bit once during each recirculation of such bit. The arrangmenet is such that the information bit must be in phase with the memory clock, and the pulse width must be such as to encompass only one pulse of the memory clock.

While various forms of delay lines may be used in the memory unit, it has been found that particularly advantageous results from the standpoint of low bulk, low weight, and low power consumption are attained if the delay line is based on the magneto-strictive principle. However, it should be understood that the counting device of the present invention represents a system concept, which is valid irrespective of the components making up the system and all of which are known to the art.

For an understanding of the principles of the invention, reference is made to the following description of typical embodiments thereof, as illustrated in the accompanying drawings.

Figure 1:
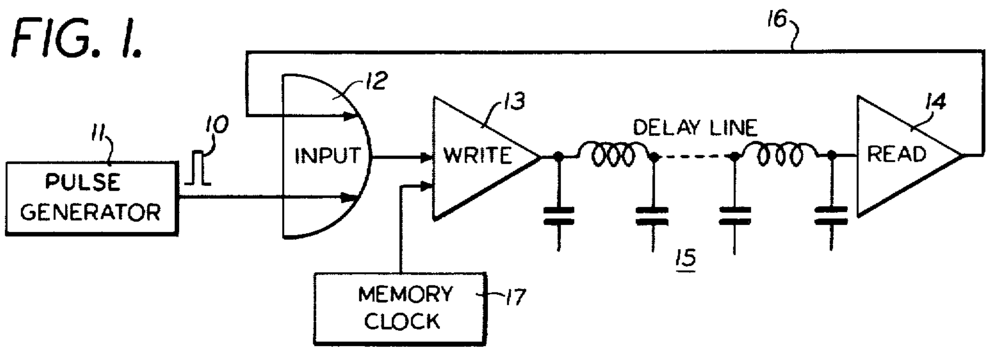
FIG. 1 is a schematic block diagram of a simple memory system illustrating, in a simple manner, a principle of the invention.

Referring to FIG. 1, which illustrates, in a simple manner, the information storage feature of the invention, an input pulse, or a series of input pulses 10, generated, for example, by a pulse generator 11, are directed to an input 12, and written into a delay line 15 by a "write" amplifier 13. The pulses 10 are read out of the other end of the delay line 15 by a "read" amplifier 14, and the thus read-out pulses are fed back to the input 12 over a pulse recirculating line 16. In order to achieve a 100 bit storage capacity, the pulse width of the information stored in the delay line 15 must be less than one microsecond and the delay line length must be 100 microseconds. To provide that the stored information does not, due to cumulative tolerances, change its position with respect to time $(T)=0$, a one megacycle memory clock 17 preferably is provided to re-clock each information bit once during each recirculation. For proper operation, the information must be in phase with the memory clock, and the pulse width must be such as to encompass only one pulse of the memory clock.

If information is written into the delay line 15 one bit at a time, and the time interval between the writing in of bits differs by one microsecond from the length of the delay line 15, the information will be stacked in the delay line at the rate of one bit every microsecond. Solely by way of example, if the interval between writing bits into the delay line is 99 microseconds, then one bit will be stored in the delay line each microsecond. Thus, at time $(T)=0$, a first information bit is written into the delay line 15 through the amplifier 13. 99 microseconds later, a second information bit is written into the delay line in the same manner. However, if delay line 15 is 100 microseconds long, the information bit which is first written in will be read out by amplifier 14, recirculated through line 16, and be rewritten into the delay line 15, by amplifier 13, one microsecond after the second new bit has been written into the delay line 15 by the amplifier 13.

The objectives of the invention can be attained most effectively when the delay line is a magneto-strictive delay line. It is therefore considered advisable to provide, at this point, a brief discussion of the development of a magneto-strictive delay line.

Although the magneto-strictive principle is not new, and is, on the contrary old and well known, it is only recently that a practical application of this principle has been developed. Prior to this latest development, the most widely used application of the magneto-strictive principle in electronics involved the use of a mercury filled column as a magneto-strictive type delay line for radar applications. However, this particular type of magneto-strictive delay line had many disadvantages with respect to size, weight, resistance to environmental conditions, and the like, and has thus found only limited use in practice.

There has recently been developed a wire type delay line using the magneto-strictive principle, and this delay line has been applied as a memory unit in large computers. Such a wire type delay line has distinct advantages over other memory devices, as set forth above.

The underlying principle of the wire type magneto-strictive delay line is the conversion of an electrical impulse into a mechanical stress which will travel through the wire at a known velocity. A sensing device at the terminal end of the delay line converts this mechanical stress back into an electrical impulse.

Figure 2:
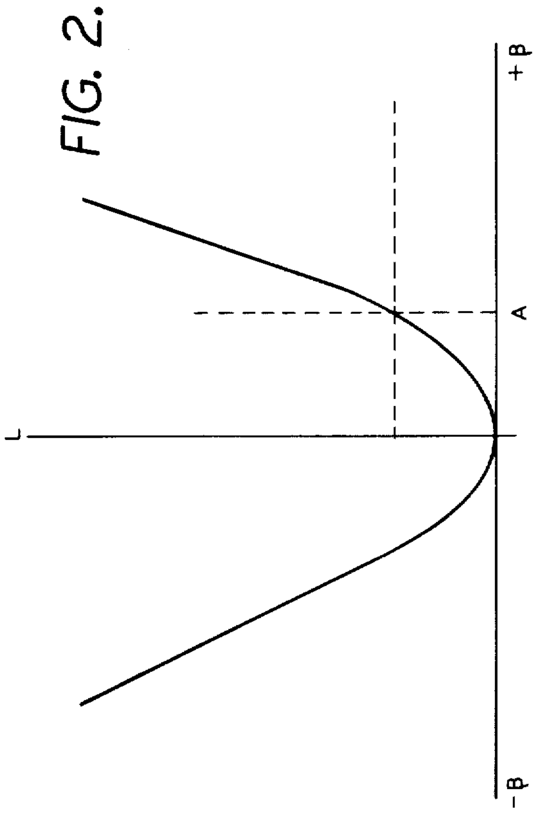
FIG. 2 is a representative curve of flux density v. length of a nickel alloy tape subjected to magneto-striction.

The development of the wire type magneto-strictive delay line is based upon the principle that certain metals, when subjected to magnetic lines of force, will change their physical dimensions. The degree of change is a function of the flux density of the field and of the type of the material being used for the line. FIG. 2 illustrates a representative curve of flux density v. length for a nickel alloy tape. As illustrated in FIG. 1, the length of the tape will increase when the tape is introduced into a magnetic field, irrespective of the polarization of the field. Thus, if a small permanent magnet is placed in close proximity to the nickel alloy tape, the length of the tape will be increased. If the flux density is of the proper magnitude, the nickel alloy tape is effectively biased as shown by the point A of FIG. 2.

Figure 3:
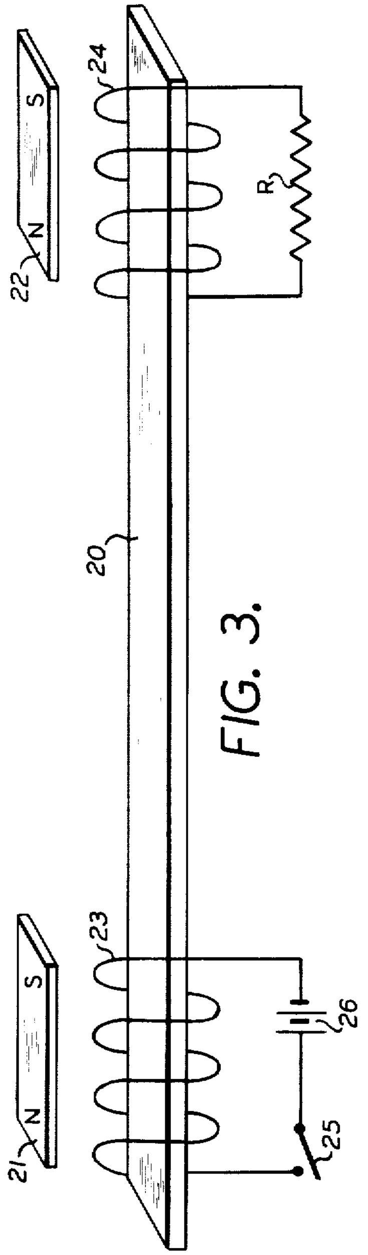
FIG. 3 is a schematic illustration of a simple magneto-strictive delay line.

Referring to FIG. 3, if a second and variable magnetic field is applied to the system, the length of the nickel alloy wire or tape can be made to increase or decrease in accordance with the varying effects of the second field. Thus, if a first permanent magnet 21 is placed near one end of a nickel alloy tape or wire 20, and if a second permanent magnet 22 is placed near the opposite end of the nickel alloy tape or wire 20, and if the input end of the tape 20, adjacent the magnet 21, is inserted through an input coil 23 with the output end of the tape, adjacent the permanent magnet 22, being inserted through a coil 24, then, if the current flow in winding 23 is varied, there will be a variation in magnetic flux. Due to the magneto-strictive principle, this variation in flux induced in the winding 23 will cause a variation in the flux induced into the winding 24. For example, if switch 25 is closed, battery 26 will be connected in series with the winding 23 resulting in an initial surge of current through the winding and a corresponding variation in the flux thereof. This will create a longitudinal stress in the tape 20, and this stress will be propagated along the length of the tape at an approximate rate of 6.2 microseconds per inch. Thus, if it is assumed that the tape is four inches in length, this stress would reach the transducer or output end of the tape 20 in approximately 24.8 microseconds. The resultant movement of the alloy tape within the field of the permanent magnet 22 will cause a small current to be induced in the winding 24 and flow through the resistance R. There will be a time delay of approximately 24.8 microseconds between the time of closing the switch 25 and the time when the signal potential appears across the resistance R.

Figure 4:
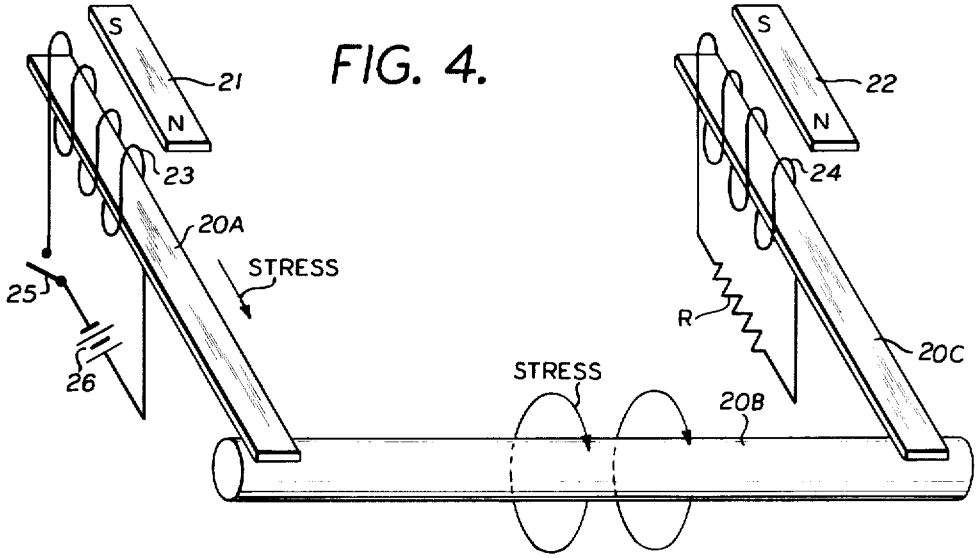
FIG. 4 is a similar view of a magneto-strictive delay line incorporating the torsional mode of operation.

FIG. 3 illustrates the longitudinal mode of operation of a magneto-strictive delay line. If longer delays per unit length of the delay line are required, a torsional mode of operation may be used as shown in FIG. 4. In this arrangement, a first nickel alloy tape 20A having its input end associated with a permanent magnet 21 and a coil 23 energized by a battery 26 through a switch 25, has its output end connected in torque exerting relation with a rod 20B. A second nickel alloy tape 20C has its input end connected into torque receiving relation with the other end of the rod 20B, and its output end is associated with a permanent magnet 22, an output coil 24, and resistance R. In this torsional mode of operation, the propagation time of the stress is approximately 8.6 microseconds per inch of delay line.

Figure 5:
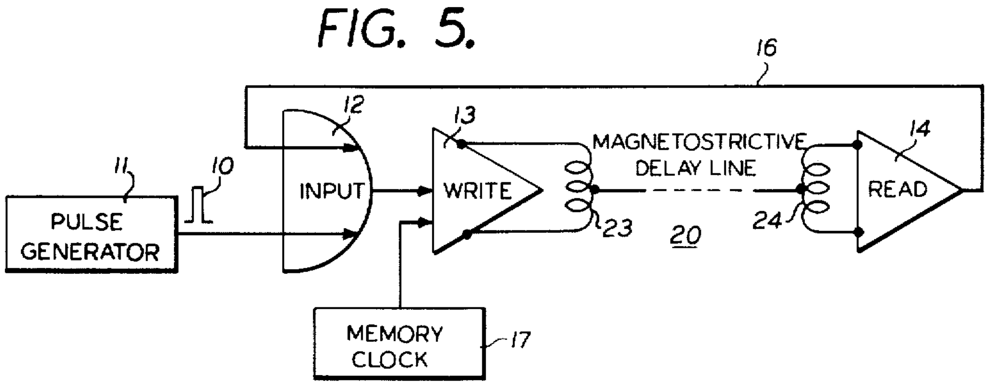
FIG. 5 is a view, similar to FIG. 1, of a simple memory system embodying a magneto-strictive delay line such as shown in FIGS. 3 and 4.

FIG. 5 schematically illustrates a delay line of the type shown in either FIG. 3 or FIG. 4 as incorporated in a system of the type shown in FIG. 1. In this arrangement, the output of the "write" amplifier 13 is applied to the input coil 23 of the nickel wire or tape 20, and the output of the winding 24 is applied to the input of the "read" amplifier 14. Otherwise, the arrangement operates in exactly the same manner as described in connection with FIG. 1.

Figure 6:
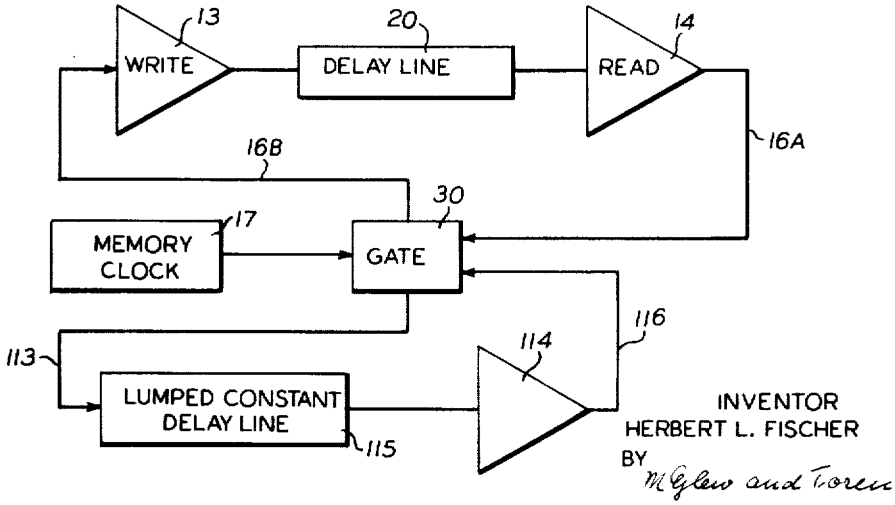
FIG. 6 is a block diagram of a digital counting system, embodying the invention and using a magneto-restrictive delay line in combination with a lumped constant delay line.

Referring to FIG. 6, a digital counting system using a magneto-strictive delay line 20 and a lumped constant delay line 115, together with a gate 30, is illustrated. The key to the operation of this system is the relationship of the rate of the time clock 17 to the length of the magneto-strictive delay line 20 and the logic performed by the gate 30.

Gate 30 functions in the following manner. At any time that gate 30 "sees" coincidence between the pulse at one of its inputs and a pulse input at either one or both of its other input lines, it will route an output pulse to the one microsecond lumped constant delay line 115 having a "read" amplifier 114 whose output is connected to the gate input line 116 constituting one of the inputs of gate 30. When gate 30 "sees" a signal input with no coincidence with respect to either the clock 17, the output of "read" amplifier 14, or the output of "read" amplifier 114, it will route this single input pulse into the "write" amplifier 13.

Figure 7:
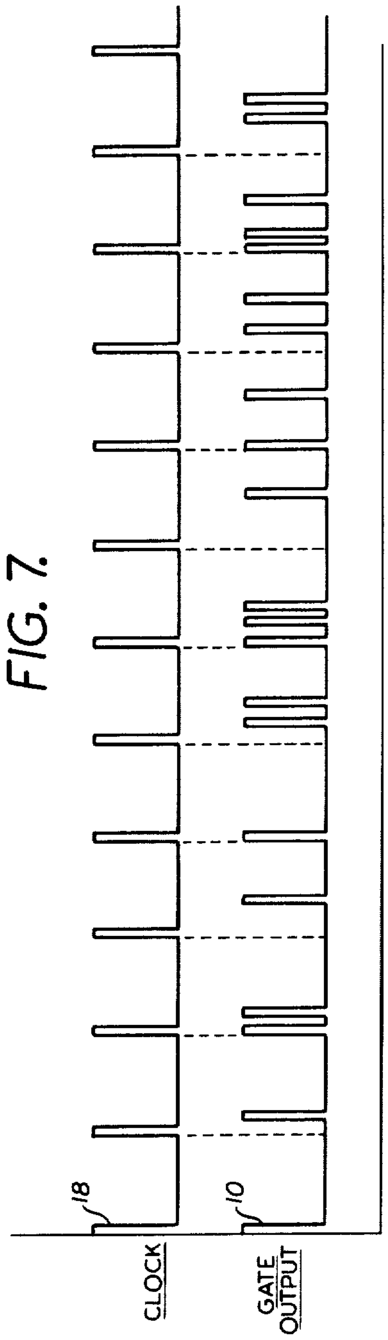
FIG. 7 is a pulse-time diagram illustrating the operation of the system shown in FIG. 6.

The resulting operation is diagrammatically illustrated in FIG. 7. At time $(T)=0$, a clock pulse 18 is fed to gate 30. Since there are no other inputs to gate 30, this clock pulse is routed to the "write" amplifier 13 and travels through the delay line 20 to the "read" amplifier 14. If the delay line is assumed to be 100 microseconds in length, and if the repetition rate of the clock is assumed to be 100 microseconds, the output pulse from "read" amplifier 14 and a second pulse 18 from clock 17 will appear at gate 30 in coincidence. A pulse is therefore routed to the one microsecond lumped constant delay line 115. One microsecond later, this latter pulse, which has been amplified, appears as an input to gate 30. Since there are no other inputs to gate 30 at this time, this single pulse is routed to the "write" amplifier 13 and through the delay line 20. 99 microseconds later, a third pulse 18 from clock 17 appears at the input of the gate 30 and is routed to the "write" amplifier 13. One microsecond later, the pulse which was in the delay line 20 reaches gate 30 and is directed back to the "write" amplifier 13.

Using the clock pulse 18 as a reference, it will be noted that, for each consecutive pulse 18 from clock 17, the binary representation of that number clock pulse will appear in the magneto-strictive delay line 20. A 100 microsecond delay line 20 is therefore capable of counting $2^{100}$ input pulses. At a clock rate of 100 microseconds, the time required to saturate the system is therefore $100\times10^{-6}\times2^{100}$ seconds.

Figure 8:
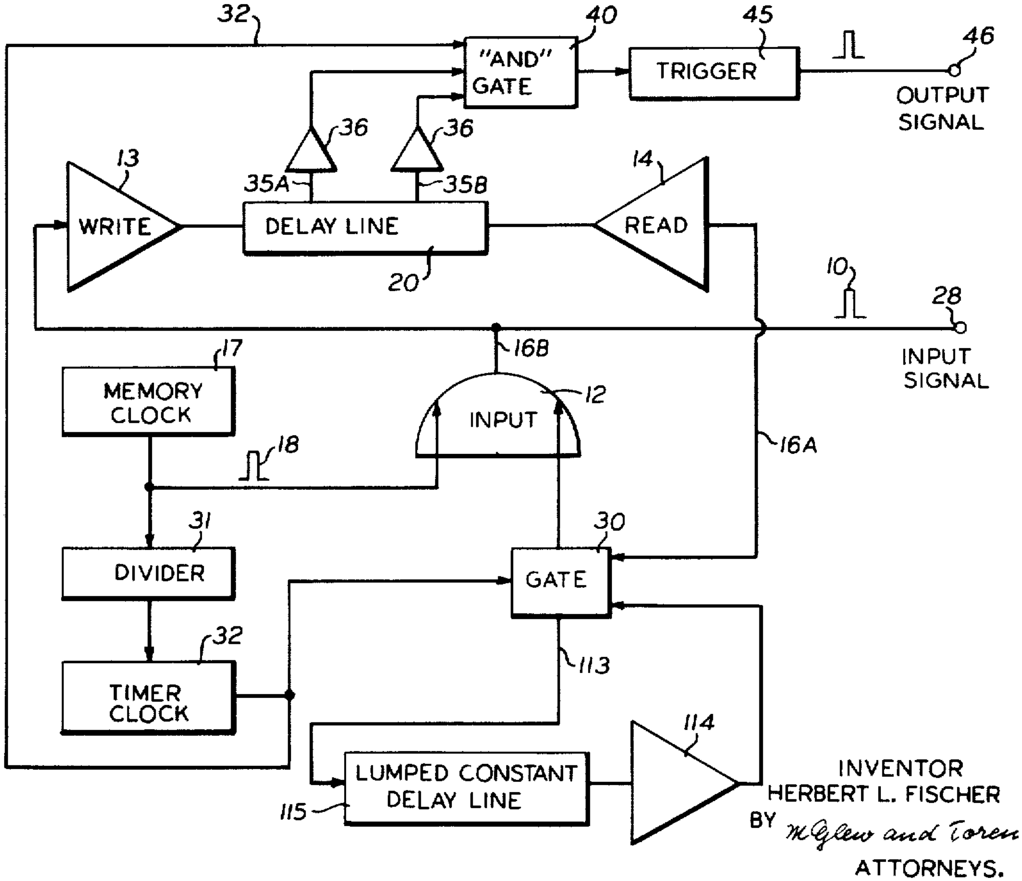
FIG. 8 is a block diagram, similar to FIG. 6, of a digital counting system with a divider, delay line taps, tap amplifiers, an "AND" gate, and a trigger added thereto.

The system shown in FIG. 8 is generally similar to that shown in FIG. 6. However, a divider 31 has been provided to subdivide the output of the memory clock 17 to provide a timer clock 32. Also, the delay line is provided with taps 35A and 35B, for example, each having an amplifier 36 and providing inputs for an "AND" gate 40. The output of "AND" gate 40 is applied to a trigger 45 connected to an output terminal 46. The delay line taps 35A and 35B are used to provide an "AND" function between bits of information at various points along the delay line. This is best illustrated in the graphical representation of FIG. 9.

Figure 9:
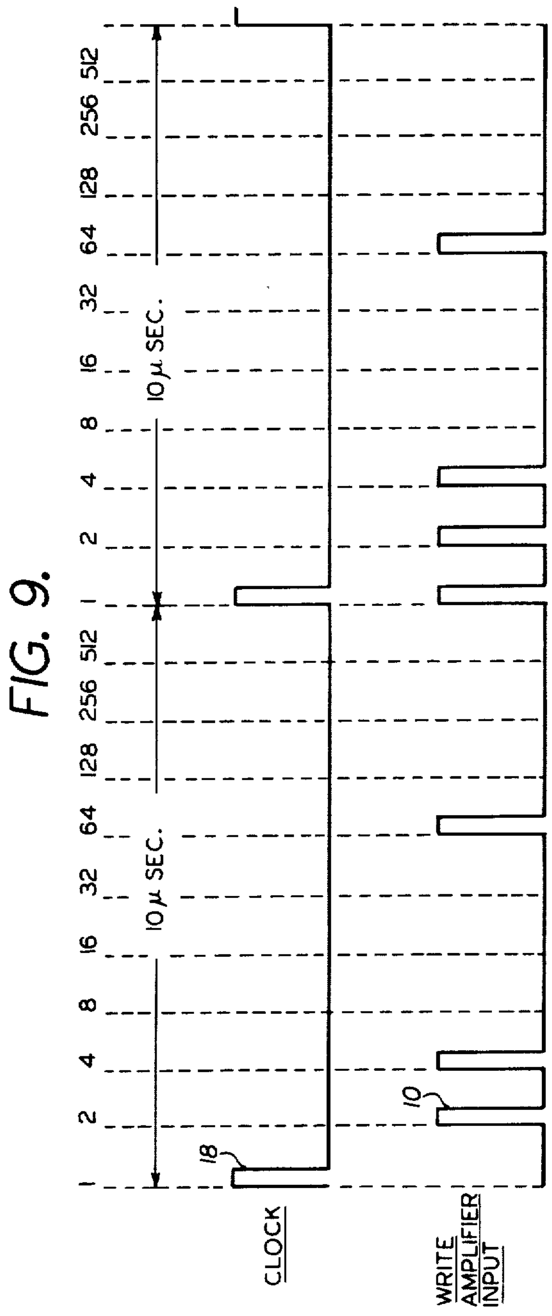
FIG. 9 is a pulse-time diagram, similar to FIG. 7, illustrating the operation of the system shown in FIG. 8.

Referring to FIG. 9, the intervals of the timer clock 32 and that of the delay line 20 are 10 microseconds. If a time delay between the receipt of a signal at input terminal 28 and the appearance of a signal at output terminal 46 is desired to be 700 microseconds, for example, then, using the memory clock pulse 17 as a reference, a tap would be placed on delay line 20 at the binary positions for "64," "4," and "2." The first time that an "AND" function appears for these three taps, in time, will be at the binary number "70." With a 10 microsecond interval for the timer clock 32, this would require 700 microseconds. Thus, if the three tap outputs are amplified, as by amplifiers 36, the trigger 45 will be "fired" 700 microseconds after operation of the system is initiated by receipt of the pulse 10 at the input terminal 28.

The accuracies obtainable with the system illustrated in FIG. 8 are limited only by the clock accuracy. The disadvantage is that each tap would require at least one "AND" gate and associated circuits. Consequently, and referring again to the example of FIG. 9, to obtain a delay of 1023 microseconds within one microsecond, 10 taps plus associated amplifier circuits and "AND" gates for each tap would be required.

In order to provide the most efficient system with respect to the counts required v. the number of delay line taps, without loss of accuracy, it is necessary to alter the delay line length slightly and to alter the timer clock rate. For example, to obtain a count of 8950 microseconds, a tap 35 and associated amplifier 36 normally would be required for the "512," "256," and "128" count positions to bring the accuracy to within one count. By a slight modification of delay line 20, and a slight modification of the timer clock interval, this can be reduced to two taps. This is effected by making the "512" count plus the "256" count, a total of "768" counts, equal to 8950 microseconds. When this is done, the following relations pertain:

*Equation A*

$$(768)(X\cdot 10^{-6})=8950\cdot 10^{-6}$$
$$X=\frac{8950\cdot 10^{-6}}{768\cdot 10^{-6}}$$
$$X=11\cdot 65$$

where X is equal both to the delay line length and the clock pulse interval in microseconds.

Thus, even in the worst case of selected time delay, by minor modification of the length of delay line 20 and of the pulse interval of timer clock 32, the required delay can be very closely approached by using only two taps. It should be noted that, in the system of FIG. 8, the pulses from timer clock 32 must also be applied to the "AND" gate 40 in order to reference the information at each tap to the pulses from memory clock 17.

It should further be noted that the systems described require only a suitable combination of transistors and diodes, having a relatively low current drain. Since all of the circuitry and the components described above are well known to the art, the invention resides entirely in the systems and not necessarily in the construction of any of the components. The systems have a very low power drain, require only a very small input voltage, have an extensive temperature range from a timing tolerance of less than 0.1%, and an overall weight of the order of one pound. If it is necessary to take into consideration possible pulse transistion time, then this can be easily handled by using one or more small lumped constant delay lines to balance any adverse effect. Also, the delay line taps 35 may well be adjustable over a two or three microsecond range to insure the ability to accurately select the desired digit.

While specific embodiments of the invention have been shown and described in detail in order to illustrate the application of the principles of the invention, it will be understood that the invention may be embodied otherwise without departing from such principles.

What is claimed is:

1. A long-term timing device comprising, in combination, delay line means having a time-length, between its input and output ends, equal to a first preselected number of time units; a gate having an output connected to the input end of said delay line means and a first input connected to the output end of said delay line means; means for supplying periodic pulses to a second input of said gate, the number of said time units between successive periodic pulses being equal to said first preselected number; and a lumped constant delay line, having a time length, between its input and output ends, equal to one of said time units, said lumped constant delay line connecting another output of said gate to a third input thereof for circulation of pulses with a delay equal to one time unit, said gate, upon coincidence between pulses at any two or all three of its inputs, routing a pulse through said lumped constant delay line and otherwise routing an input pulse to said delay line means; whereby to provide groups of pulses circulating through said delay line means with the pulses in each group being separated by one time unit.

2. A long-term timing device comprising, in combination, delay line means having a time-length, between its input and output ends, equal to a first pre-selected number of time units, a gate having an output connected to the input end of said delay line means and a first input connected to the output end of said delay line means; means for supplying pulses periodically to a second input of said gate, the number of said time units between successive pulses being equal to said first preselected number; a lumped constant delay line, having a time length, between its input and output ends, equal to one of said time units, said lumped constant delay line connecting another output of said gate to a third input thereof for circulation of pulses with a delay equal to one time unit; said gate, upon coincidence between pulses at any two or all three of its inputs, routing a pulse through said lumped constant delay line and otherwise routing an input pulse to said delay line means; whereby to provide groups of pulses circulating through said delay line means with the time interval between successive pulses of each group being equal to one time unit; and timing means connected to said delay line means to reclock each pulse once during each recirculation of the latter.

3. A long-term timing device as claimed in claim 1, in which said delay line means includes a magneto-strictive delay line.

4. A long-term timing device as claimed in claim 2, in which said delay line means includes a magneto-strictive delay line.

5. A long-term timing device and digital counter comprising, in combination, a first delay line having a time-length, between its input and output ends, equal to a first pre-selected number of microseconds; a lumped constant delay line having a time length equal to one microsecond; a gate having a first output connected to the input of said first delay line and a second output connected to the input of said lumped constant delay line; a pulse recirculating line connecting the output of said first delay line to a first input of said gate; a pulse return line connecting the output of said lumped constant delay line to a second input of said gate; and a clock having a repetition period in microseconds equal to said first pre-selected number of microseconds, and connected to a third input of said gate; said gate, upon the appearance of a clock pulse at any input coincident with the appearance of a pulse at either or both of its other inputs, routing a pulse through its second output to said lumped constant delay line; said gate, upon the appearance of a pulse at any one of the three inputs non-coincident with any pulses at any other of its three inputs, routing said last named pulse to the input of said first delay line; whereby, for each consecutive clock pulse in said first delay line, the binary representation of that number clock pulse will appear in said first delay line as a pulse group having an interval, between pulses, dependent on such number.

6. A long-term timing device and digital counter as claimed in claim 5, in which said first delay line is a magneto-strictive delay line.

7. A long-term timing device and digital counter as claimed in claim 5, in which said clock has a repetition rate of 100 microseconds, and the length of said first delay line is 100 microseconds.

8. A long-term timing device and digital counter as claimed in claim 7, in which said first delay line is a magneto-strictive delay line.

9. A long-term timing device and digital counter comprising, in combination, a first delay line having a time-length equal to a first pre-selected number of microseconds; a lumped constant delay line having a time-length of one microsecond; a gate having a first output connected to the input of said first delay line, and a second output connected to input of said lumped constant delay line; a pulse recirculating line connecting the output of said first delay line to a first input of said gate; a pulse return line connecting the output of said lumped constant delay line to a second input of said gate; a memory clock having its output connected to the input of said first delay line; a trigger signal line connected to the input of said first delay line; a timer clock having its output connected to a third input of said gate; a divider connecting said memory clock to said timer clock to provide a repetition rate, for said timer clock, equal in microseconds to said first preselected number of microseconds; and trigger means connected to a point along said delay line corresponding to a selected delay time following a trigger signal; said gate, upon the appearance at any input of a pulse from said timer clock coincident with the appearance of a pulse at either or both of its other inputs, routing an output pulse to said second output and to said lumped constant delay lines; said gate, upon the appearance of the pulse at any one of its three inputs non-coincident with the appearance of the pulse at either of its other two inputs, routing said last-named pulse to the input of said first delay line; whereby, for each consecutive pulse of said timer clock as a reference, the binary representation of the number of said clock pulse will appear in said first delay line.

10. A long-term timing device and digital counter, as claimed in claim 9, including an "AND" gate having its output connected to said trigger means; tap means connecting the input of said "AND" gate to respective taps on said first delay line each corresponding to a different binary representation of a particular pulse of said timer clock and all being coincident at such selected delay time; whereby, responsive to a clock pulse entering the input of said first delay line coincident with pulses at said tap means, said "AND" gate will supply a trigger pulse to said trigger means a number of microseconds after receipt of said clock pulse equal to said selected delay time.

11. A long-term timing device and digital counter as claimed in claim 10, in which said first delay line is a magneto-strictive delay line.

12. A long-term timing device and digital counter as claimed in claim 10, including amplifiers connected in each of said tap lines.

13. A long-term timing device and digital counter, as claimed in claim 10, in which, for a triggering time delay corresponding to coincidence of three binary taps the length of said first delay line and of the interval of the timer clock is equal to the triggering time delay divided by the sum of two of said binary taps; whereby said triggering time delay may be obtained by using only two binary taps.

14. A long-term timing device and digital counter, as claimed in claim 10, in which said tap lines are adjustable over a two to three microsecond range for accurate selection of the desired digit to be tapped.

References Cited by the Examiner

UNITED STATES PATENTS

| | | | |
|---|---|---|---|
| 2,401,094 | 5/1946 | Nicholson | 324—69 |
| 2,794,979 | 6/1957 | Palmer | 324—68 |
| 2,800,580 | 7/1957 | Davis | 324—79 |
| 2,877,413 | 3/1959 | Muehlner | 324—68 |
| 3,068,405 | 12/1962 | Glazer et al. | 324—68 |

OTHER REFERENCES

Pages 1676–78, October 1958, "Basic Types of Delay Lines" (D. L. Arenberg), Instruments and Automation, vol. 31.

ROBERT C. BAILEY, *Primary Examiner.*

FREDERICK M. STRADER, *Examiner.*